(12) United States Patent
Pegg et al.

(10) Patent No.: US 10,939,250 B2
(45) Date of Patent: *Mar. 2, 2021

(54) DYNAMIC VIRTUAL BOUNDARY METHODS AND SYSTEMS

(71) Applicant: Verizon Patent and Licensing Inc., Arlington, VA (US)

(72) Inventors: Antony Pegg, East Petersburg, PA (US); Elise Neel, Castle Rock, CO (US); Colson Hillier, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,759

(22) Filed: Feb. 21, 2020

(65) Prior Publication Data

US 2020/0196107 A1 Jun. 18, 2020

Related U.S. Application Data

(63) Continuation of application No. 16/041,437, filed on Jul. 20, 2018, now Pat. No. 10,575,134.

(51) Int. Cl.
*H04W 4/029* (2018.01)
*G01S 19/14* (2010.01)
*G01S 19/24* (2010.01)
*H04W 4/021* (2018.01)

(52) U.S. Cl.
CPC ............. *H04W 4/029* (2018.02); *G01S 19/14* (2013.01); *G01S 19/24* (2013.01); *H04W 4/021* (2013.01)

(58) Field of Classification Search
CPC ..... H04W 4/029; H04W 4/021; H04W 4/022; G01S 19/14; G01S 19/24; G01S 19/41; G01S 5/00; G08B 21/0225; G08B 21/0236; G08B 21/0294; G08B 21/0269; G08B 21/0261; G08B 21/22
USPC .... 340/539.1, 539.11, 539.13, 988, 989, 992
See application file for complete search history.

(56) References Cited

U.S. PATENT DOCUMENTS

| | | | |
|---|---|---|---|
| 6,186,793 | B1 | 2/2001 | Brubaker |
| 6,441,752 | B1 | 8/2002 | Fomukong |
| 7,102,493 | B1 | 9/2006 | Coppinger et al. |
| 10,575,134 | B2 * | 2/2020 | Pegg .......................... G01S 5/00 |
| 2010/0148947 | A1 | 6/2010 | Morgan et al. |
| 2013/0180468 | A1 * | 7/2013 | Dutcher ............... H04W 4/021 119/721 |
| 2014/0236686 | A1 | 8/2014 | Grush et al. |
| 2018/0184618 | A1 * | 7/2018 | Gotts ...................... H04L 67/18 |

(Continued)

*Primary Examiner* — Daryl C Pope

(57) ABSTRACT

An exemplary virtual boundary system accesses a positioning signal generated by a positioning system. A geolocation for a real-time tracking device is derivable from the positioning signal within a first margin of error. The virtual boundary system also accesses a correction signal generated by a positioning enhancement system and corresponding to the positioning signal generated by the positioning system. Based on the positioning signal and the correction signal, the virtual boundary system determines a refined geolocation of the real-time tracking device relative to a user-specified geographic boundary. The refined geolocation is accurate within a second margin of error that is less than the first margin of error. Corresponding methods and systems are also disclosed.

20 Claims, 11 Drawing Sheets

(56) References Cited

U.S. PATENT DOCUMENTS

2019/0104707 A1\* 4/2019 Gotts .................. A01K 27/009
2019/0281573 A1 9/2019 Tyagi et al.

\* cited by examiner

DYNAMIC VIRTUAL BOUNDARY METHODS AND SYSTEMS

RELATED APPLICATIONS

This application is a continuation application of U.S. patent application Ser. No. 16/041,437, filed Jul. 20, 2018, and entitled "Dynamic Virtual Boundary Methods and Systems," which is hereby incorporated by reference in its entirety.

BACKGROUND INFORMATION

In various situations, people who have authority or control over a subject (e.g., an animal, a machine, another person, etc.) implement physical boundaries and markers to confine the subject to a particular geographical area. For example, animal fences (e.g., electric dog fences that have electric wires either above or below ground, fences for keeping livestock grazing within a particular area, etc.) may be used to confine animals to the property of the animal's owner, boundary markers may be used to facilitate movement of automated machines (e.g., robotic lawnmowers, farming equipment, etc.) operating within an area such as a yard or field, and physical fences and signs may be used to urge human beings to stay in a particular area (e.g., children within a schoolyard, parolees on house arrest within their premises, runners or bikers to a designated race route, etc.). While such physical boundaries and markers may be effective in confining subjects to particular geographic areas, these physical constructs may be unsightly, expensive, inconvenient, and/or difficult to move or modify.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
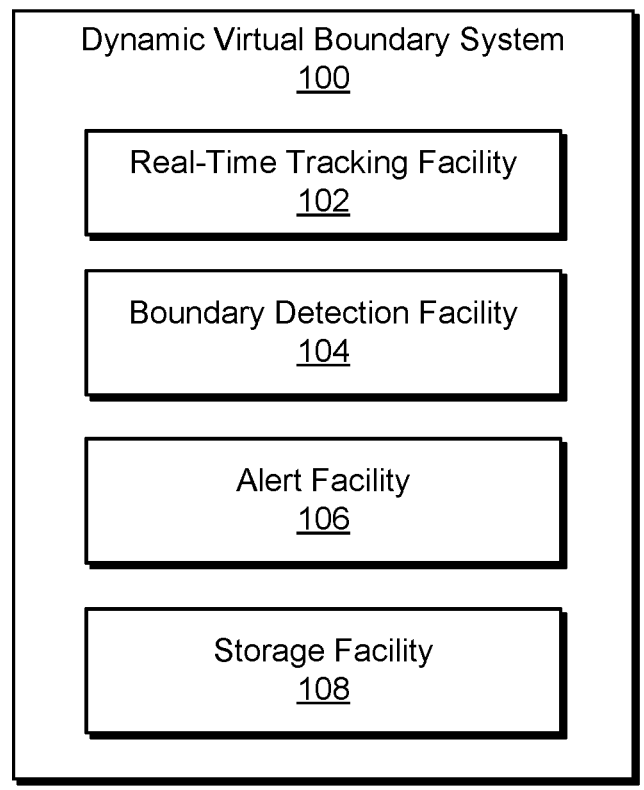
FIG. 1 illustrates an exemplary dynamic virtual boundary system for constraining a subject within an area defined by a user-specified geographic boundary according to principles described herein.

Dynamic virtual boundary methods and systems that may be used to constrain a subject within an area defined by a user-specified geographic boundary are described herein. For example, as will be described in more detail below, an exemplary dynamic virtual boundary system may access a positioning signal from which a geolocation accurate within a first margin of error is derivable for a real-time tracking device carried by a subject. The positioning signal may be generated, for instance, by a satellite included within a satellite-based positioning system (e.g., the Global Positioning System ("GPS")), and may be received by the real-time tracking device. The dynamic virtual boundary system may also access a correction signal corresponding to the positioning signal generated by the satellite. For instance, the correction signal may be generated by a terrestrial positioning enhancement system (e.g., a real-time kinematic ("RTK") positioning system) and may be received by the real-time tracking device. Additionally, the dynamic virtual boundary system may access dynamic virtual boundary data that defines a user-specified geographic boundary. In some examples, the user-specified geographic boundary may be configured to change in real time (e.g., to shrink in size, to expand in size, to move from one geographic location to another, etc.).

Based on the positioning signal and the correction signal, the dynamic virtual boundary system may continuously determine a refined geolocation of the real-time tracking device. Compared to the geolocation that is derivable from the positioning signal alone, the refined geolocation may be considerably more accurate. For example, the refined geolocation may be accurate within a second margin of error less than the first margin of error (e.g., giving the refined geolocation centimeter-level accuracy in some examples, rather than the meter-level accuracy of the geolocation derivable based on the positioning signal alone).

The dynamic virtual boundary system may continuously monitor whether the refined geolocation of the real-time tracking device is within a predetermined distance of the user-specified geographic boundary. For example, this continuous monitoring may be performed as the user-specified geographic boundary is changing in real time (e.g., as the user-specified geographic boundary is shrinking, expanding, moving, etc.) and/or as the real-time tracking device is being carried by the subject to different geolocations. Based on a determination (e.g., during the continuous monitoring) that the refined geolocation is within the predetermined distance of the user-specified geographic boundary, the dynamic virtual boundary system may provide an alert configured to assist in constraining the subject within an area defined by the user-specified geographic boundary. For example, an alert may be provided to the subject, to a person who has authority over the subject (e.g., to a user who specified the user-specified geographic boundary), or to both.

In certain examples, the dynamic virtual boundary system described above may be used in the context of virtual fences for constraining pets. For example, the real-time tracking device carried by the subject may be implemented by a collar worn by a pet such as a dog, a cat, or the like. In these examples, a person responsible for the pet (e.g., the pet owner, etc.) may be referred to as a "user" of the dynamic virtual boundary system, and this user may be responsible for originally specifying (as well as dynamically changing, if desired) the user-specified geographic boundary. For example, the user may provide user input by way of a user interface presented by an access device (e.g., a user interface provided by an application executed by a mobile computing device) from which the dynamic virtual boundary data defining the user-specified geographic boundary may be generated. When the pet wearing the collar approaches or crosses the user-specified geographic boundary, alerts may be provided to the pet (e.g., by a vibration, a sound, a shock, etc., applied by the collar) and/or to the user (e.g., by way of a notification on the access device).

Various examples and additional detail will be provided below relating to dynamic virtual boundary systems implemented in the context of virtual pet fences. However, it will be understood that the principles described herein in the virtual pet fence context may also be applied to various other types of subjects in other contexts. For example, dynamic virtual boundary methods and systems such as those described herein may help constrain subjects such as non-pet animals (e.g., farm animals, etc.), machines (e.g., automated yard care or farming equipment, etc.), people (e.g., children, parolees, etc.), and other suitable subjects within any user-specified geographic boundary as may serve a particular implementation. In these examples, rather than a collar worn by the subject, the real-time tracking device may be implemented in other suitable ways such as by a wrist or ankle bracelet worn by a person, by a mobile device carried by a person, by circuitry integrated within a machine (e.g., an IoT device integrated into a robotic lawnmower, etc.), or the like.

Dynamic virtual boundary systems described herein may be implemented by a real-time tracking device (e.g., a pet collar device), a controller system (e.g., a web server operated by a service provider, an access device such as a smartphone or personal computer used by a user), or any other systems or devices as may serve a particular implementation. Additionally, in certain examples, a dynamic virtual boundary system may be implemented by a combination of these systems and devices, such as by having its functionality performed by both a real-time tracking device and a controller system. Any of the operations described above (and/or other suitable operations) may be performed by the dynamic virtual boundary system in any manner as may serve the configuration of a particular system implementation (i.e., the configuration of the particular systems and/or devices implementing the dynamic virtual boundary system). Examples of different such configurations for implementing exemplary dynamic virtual boundary systems will be described in more detail below.

The dynamic virtual boundary methods and systems described herein for constraining a subject within an area defined by a user-specified geographic boundary may provide many benefits and advantages as compared to conventional physical boundaries. For example, the dynamic virtual boundary systems described herein are more effective, customizable, flexible, and convenient than conventional physical boundaries. For example, rather than having to dig trenches, bury cables, install power supplies and/or other hardware, and so forth to implement a conventional underground pet fence, users may, in accordance with the systems and methods described herein, instantly and conveniently set up virtual boundaries (i.e., user-specified geographic boundaries) by simply drawing the boundaries on a map presented on a user interface on an access device. Moreover, just as easily as boundaries may be specified in the first instance, the boundaries may also be dynamically changed. For example, a user may set up a large area for a dog to play at a public park to keep the dog away from danger (e.g., out of the street, etc.) and away from a playground. Then, if a group of children begins playing a game within the large area, the user may easily move the boundaries of the user-specified geographic boundary to prevent the dog from going near the children. If the children later leave, the user may then easily move the user-specified geographic boundary back to the original position.

Moreover, as a result of the dynamic nature and customizability of the dynamic virtual boundary methods and systems described herein, additional advantages and features may be provided that are not possible with conventional physical boundary systems. For example, dynamic user-specified geographic boundaries may be set to change automatically, gradually, and/or in accordance with prespecified schedules. In this way, desired animal behavior may be encouraged and taught using dynamically changing fences to, for example, herd one or more animals from one area to another at a certain time of day (e.g., to let animals out into the yard during the day and automatically bring them in at night, etc.). As another example, user-specified geographic boundaries may be defined not only along a two-dimensional ("2D") surface of the earth, but may further be defined in three-dimensional ("3D") space. As such, for instance, a user-specified geographic boundary may be configured to allow a pet near the base of a tree, while disallowing the pet from climbing up into the tree, or the like. These and other exemplary features will be described in more detail below.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary dynamic virtual boundary system 100 ("system 100") for constraining a subject within an area defined by a user-specified geographic boundary. As shown, system 100 may include, without limitation, a real-time tracking facility 102, a boundary detection facility 104, an alert facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, facilities 102 through 108 may be distributed between multiple devices and/or multiple locations as may serve a particular implementation. Additionally, one or more of facilities 102 through 108 may be omitted from system 100 in certain implementations, while additional facilities may be included within system 100 in the same or other implementations.

In certain implementations, facilities 102 through 108 may be configured to operate in real time so as to constrain a subject within an area defined by a user-specified geographic boundary even as the boundary and the area it defines is changing (e.g., based on new user input, automatically according to prescheduling set up by the user, etc.). In this way, a user of an access device may provide user input to alter dynamic virtual boundary data defining the user-specified geographic boundary at any time and the subject will be constrained accordingly. For instance, if the subject is a dog and the user is the dog's owner, the owner could move or redraw a boundary defining one part of an area within which the dog is constrained and, as soon as the changes are saved or otherwise implemented, the dog may be constrained to the area defined by the moved or redrawn boundary. As used herein, operations may be performed in "real time" when they are performed immediately and without undue delay, even if certain operations are not performed instantaneously and are associated with some amount of delay such as a few seconds.

Each of facilities 102 through 108 may include or be implemented by one or more physical computing devices such as hardware and/or software components (e.g., processors, memories, communication interfaces, instructions stored in memory for execution by the processors, etc.). Additionally, in some examples, other types of hardware such as communication transceivers (e.g., for receiving positioning and/or correction signals), circuitry for applying vibrations, sounds, shocks, or other alerts to a subject, and so forth, may be further included within facilities of system 100. Facilities 102 through 108 may be implemented using separate computing components unique to each facility, or may be implemented using shared computing components. Each of facilities 102 through 108 will now be described in more detail.

Real-time tracking facility 102 may be configured to perform various operations associated with accessing information indicative of where a real-time tracking device (e.g., a pet collar or the like) that is carried by a subject is located, and using that information to determine the location of the subject with a high degree of accuracy and precision (e.g., within a few centimeters or less). Specifically, for example, real-time tracking facility 102 may be configured to access a positioning signal generated by a satellite included within a satellite-based positioning system (e.g., GPS, etc.) and received by the real-time tracking device. A geolocation accurate within a first margin of error (e.g., within a few meters) may be derivable for the real-time tracking device based only on the positioning signal. However, it may be desirable to determine the geolocation of the real-time tracking device with an even smaller margin of error (e.g., less than one meter, less than ten centimeters, etc.). Accordingly, real-time tracking facility 102 may be further configured to access a correction signal corresponding to the positioning signal generated by the satellite (e.g., configured to correct inaccuracies in the positioning signal). The correction signal may be generated by a terrestrial positioning enhancement system (e.g., an RTK base station in a network of RTK base stations) and may be received by the real-time tracking device along with the positioning signal. Based on the positioning signal and the correction signal, real-time tracking facility 102 may determine a refined geolocation of the real-time tracking device. For instance, the refined geolocation may be accurate within a second margin of error that is less than the first margin of error (e.g., a margin of error less than one meter, less than ten centimeters, etc.).

Boundary detection facility 104 may be configured to perform various operations associated with determining whether a current refined geolocation of the real-time tracking device determined by real-time tracking facility 102 is within range of a current user-specified geographic boundary that defines an area within which the real-time tracking device is to be constrained. More specifically, boundary detection facility 104 may access (e.g., retrieve from storage, receive from another source such as an access device, generate based on user input, etc.) dynamic virtual boundary data that defines the user-specified geographic boundary. As will be described in more detail below, the user-specified geographic boundary defined by the dynamic virtual boundary data may, in some examples, by configured to change in real time. For instance, the user-specified geographic boundary may change gradually and automatically at a prescheduled time set by a user, or may change under manual direction of the user. Based on the dynamic virtual boundary data (and, in some examples, as the user-specified geographic boundary and/or the geolocation of the real-time tracking device are changing), boundary detection facility 104 may continuously monitor whether the refined geolocation of the real-time tracking device is within a predetermined distance of the user-specified geographic boundary. For example, if the real-time tracking device enters a pre-specified "buffer zone" associated with the user-specified geographic boundary (e.g., a zone at the outer edge of the area defined by the user-specified geographic boundary and having a width of the predetermined distance), boundary detection facility 104 may determine that the real-time tracking device is getting close enough to the boundary that an alert (e.g., a mild warning alert) is in order. As another example, boundary detection facility 104 may determine that the real-time tracking device is right at the boundary (e.g., if no buffer zone is defined because the predetermined distance is zero, if the buffer zone has already been traversed, etc.), or has already crossed over the boundary and is outside of the area defined by the user-specified geographic boundary.

Alert facility 106 may be configured to perform various operations associated with alerting the subject and/or a user of system 100 (e.g., a user who has authority of the subject and is using system 100 to help constrain the subject) as to the status of the subject's location with respect to the user-specified geographic boundary. Specifically, for example, alert facility 106 may provide one or more alerts to the subject and/or to the user based on (and in response to) a determination by boundary detection facility 104 during the continuous monitoring that the refined geolocation is within the predetermined distance of the user-specified geographic boundary.

The alert may be configured to assist in constraining the subject within the area defined by the user-specified geographic boundary in any manner as may serve a particular implementation. For instance, if the alert is provided to the subject, the alert may assist in constraining the subject by informing the subject that the subject is too close to the boundary and should retreat back in an opposite direction. If the subject is a dog wearing a real-time tracking device built into a collar, for example, the alert sent to the dog may include a mild shock, a haptic vibration, a beeping sound, and/or any other suitable alert that may operate to capture the dog's attention and encourage the dog to move back into the area defined by the user-specified geographic boundary.

As another example, if the alert is provided to the user, the alert may assist in constraining the subject by informing the user that the subject has moved near the user-specified geographic boundary (or has moved to or past the boundary, etc., as the case may be) so that the user may be made aware and may take action to help constrain the subject if necessary or desired. For instance, if the subject is a dog and the user is the dog's owner, the owner may receive a notification on her smartphone that indicates that the dog is near the boundary and has been for several seconds. Based on the notification and the time of day, the user may realize that a postal worker is delivering the mail and may adjust the boundary to attempt to move the dog further away from the mailbox, direct the collar to administer a shock to correct barking behavior, physically intervene to help keep the dog under control and within the desired area, or perform any other action as may best serve the situation.

Storage facility 108 may store and maintain any data used by facilities 102 through 106 (and/or any other facilities included within system 100 not explicitly shown) to perform any of the operations described herein. For example, storage facility 108 may include program instructions for performing the operations described herein, as well as other data received, generated, managed, maintained, used, and/or transmitted by facilities 102 through 106 as may serve a particular implementation. In some examples, for instance, storage facility 108 may include data representative of positioning signals generated by satellites, data representative of correction signals generated by terrestrial positioning enhancement systems, data representative of geolocations of real-time tracking devices (e.g., including refined geolocations), dynamic virtual boundary data defining user-specified geographic boundaries, data used for providing alerts to users and/or subjects associated with system 100, and so forth.

As mentioned above, in different implementation configurations, system 100 may be implemented by one or more physical computing devices integrated within the real-time tracking device, a controller system communicatively coupled to the real-time tracking device (e.g., a service provider system or an access device used by a user), or any other suitable systems or devices. In some examples, system 100 may be operably distributed across two or more of such systems and devices (e.g., such that certain facilities and/or portions of facilities 102-108 are implemented by one system or device while other facilities and/or portions of facilities 102-108 are implemented by another system or device). Consequently, as used herein, operations involving actions such as "accessing," "determining," "monitoring," "providing," and so forth may be performed in different ways depending on systems or devices within which system 100 and its facilities are implemented.

For example, if real-time tracking facility 102 (or a portion thereof) is implemented within the real-time tracking device itself, the positioning signal and the correction signal may be "accessed" by the real-time tracking device receiving the signals directly from their respective sources (i.e., from the satellite included within the satellite-based positioning system and the terrestrial positioning enhancement system, respectively). The refined geolocation may then be "continuously determined" either by computing the refined geolocation using processing resources included within the real-time tracking device or by providing data representative of the signals to another computing device configured to compute the refined geolocation (e.g., the controller system, the access device, etc.) and receiving the refined geolocation therefrom after it has been computed. Conversely, because it is the real-time tracking device that receives these signals, if real-time tracking facility 102 (or a portion thereof) is implemented within the controller system (e.g., a web server or an access device) communicatively coupled to the real-time tracking device, the positioning and correction signals may be "accessed" by the controller system requesting and receiving the signals from the real-time tracking device (e.g., by way of a network such as a cellular provider network or the like) and the refined geolocation may then be "continuously determined" by computing the refined geolocation using processing resources of the controller system. In other examples, the accessing of the signals and the continuous determining of the refined geolocation may be performed by receiving the refined geolocation as it has been computed by the real-time tracking device using resources of the real-time tracking device.

Figure 2:
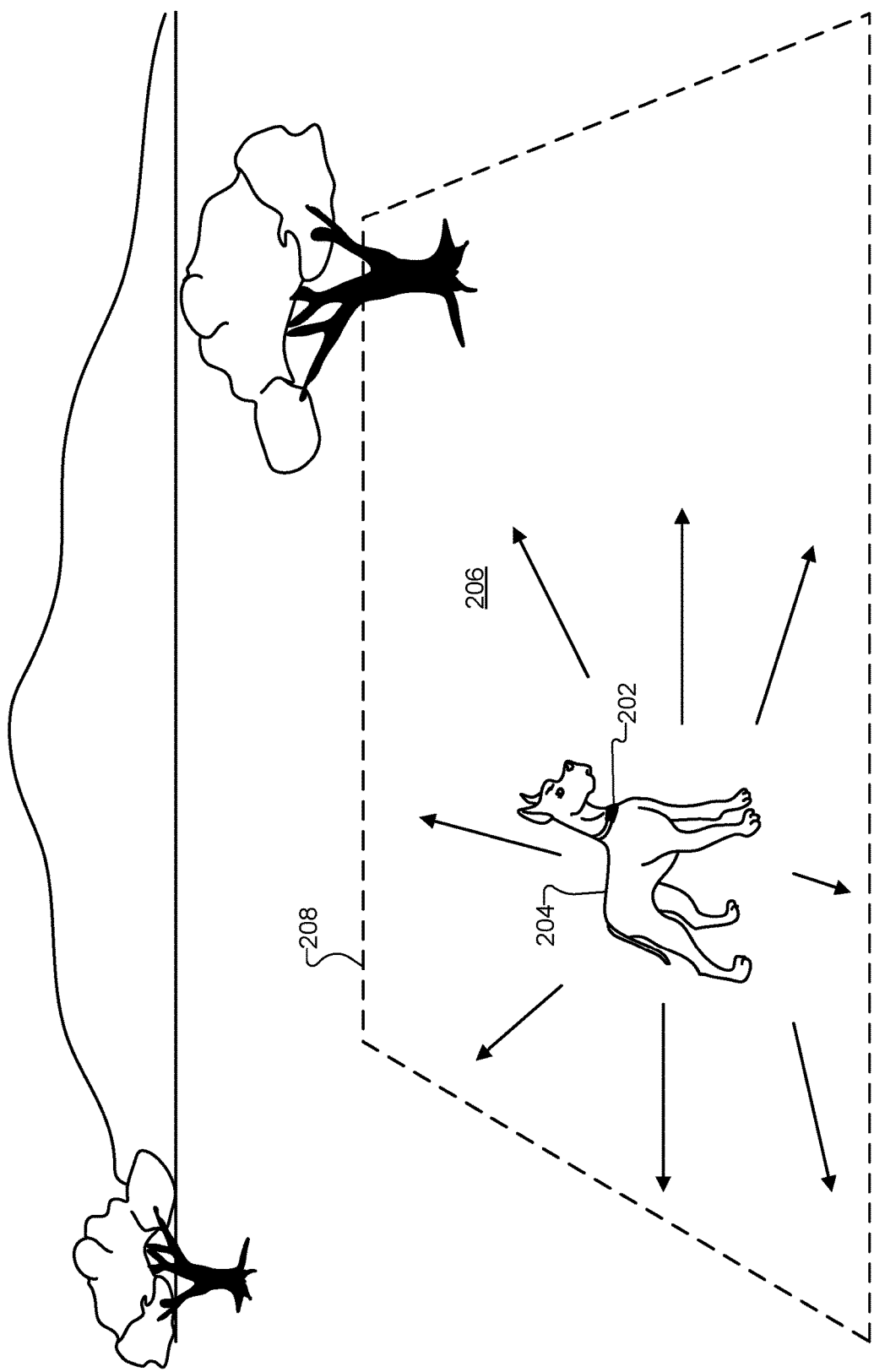
FIG. 2 illustrates an exemplary subject constrained within an exemplary area defined by a user-specified geographic boundary according to principles described herein.

FIG. 2 illustrates an exemplary subject constrained within an exemplary area defined by a user-specified geographic boundary. As used herein, a "subject" may refer to any type of living thing or inanimate object over which a person (e.g., a user of system 100) has authority, control, influence, or the like. As such, the person may use system 100 to constrain the subject within an area defined by a user-specified geographic boundary using a real-time tracking device in any of the ways described herein. To illustrate, FIG. 2 shows a real-time tracking device 202 ("device 202") being worn on a collar by a subject 204 that, in the example of FIG. 2, is shown to be a dog. While device 202 worn by subject 204 provides one example of a real-time tracking device implemented by a pet collar configured to be worn by an animal, it will be understood that other types of subjects (e.g., other pets, other animals that are not pets, machines, people, etc.) may similarly be tracked by real-time tracking devices similar to device 202. For instance, in addition to being implemented as a collar worn around the neck of an animal, device 202 could be also implemented, in other examples, as an ankle bracelet worn by a person, as a small toy carried in a pocket by a child, as circuitry built into a machine, or in various other ways and form factors as may server various implementations in various contexts.

As mentioned above, system 100 may determine a refined geolocation of device 202 to a margin of error that may be relatively small (e.g., smaller than may be possible using conventional tracking technologies such as GPS technology alone). For example, a user may wish to constrain subject 204 within an area 206 defined by a user-specified geographic boundary 208. To this end, while subject 204 may have freedom to move in any direction within area 206 (as indicated by the arrows in FIG. 2), system 100 may help constrain subject 204 within area 206 by alerting subject 204 in any of the ways described herein when subject 204 comes too close to (or crosses over) user-specified geographic boundary 208. As such, it may be desirable for the geolocation of device 202 to be known with a very small margin of error such as less than 1 meter, less than 50 centimeters, less than 10 centimeters, less than 5 centimeters, or less than 1 centimeter is certain implementations.

Figure 3:
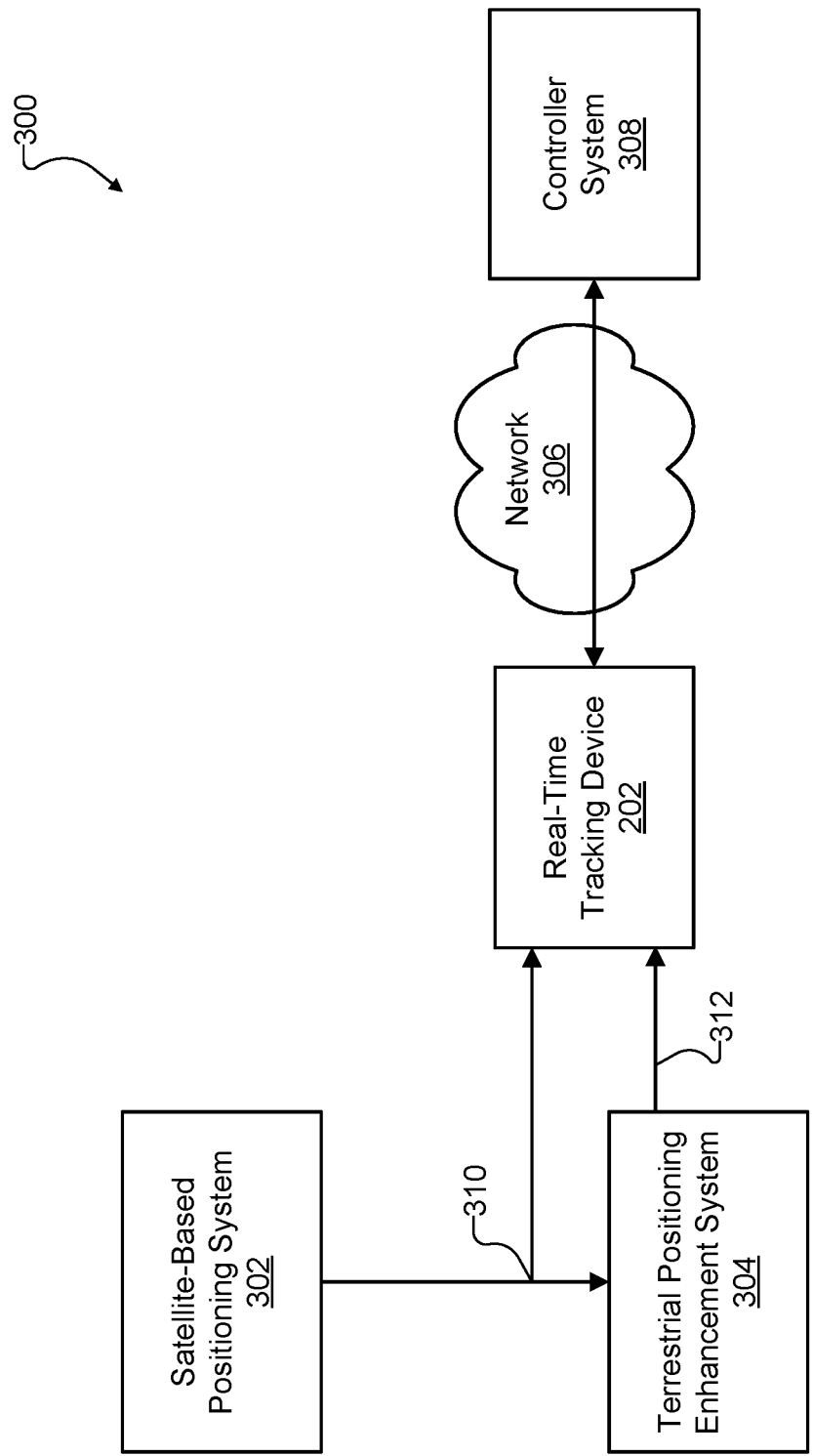
FIGS. 3 and 4 illustrate exemplary configurations in which the dynamic virtual boundary system of FIG. 1 may operate to constrain a subject within an area defined by a user-specified geographic boundary according to principles described herein.

FIG. 3 illustrates an exemplary configuration 300 in which system 100 may operate or be implemented to constrain subject 204 within area 206 defined by user-specified geographic boundary 208. Specifically, as shown, configuration 300 includes a satellite-based positioning system 302 and a terrestrial positioning enhancement system 304 each communicatively coupled with device 202. Additionally, FIG. 3 illustrates that, by way of a network 306, a controller system 308 may likewise be communicatively coupled to device 202 in configuration 300. As mentioned above, system 100 may be implemented by device 202, by controller system 308, by a combination thereof, or in other ways as may serve a particular implementation. Each of the components of configuration 300 will now be described.

Satellite-based positioning system 302 may provide one or more signals referred to as a positioning signal 310 to device 202. For example, positioning signal 310 may include one or more GPS or other such signals from which a geolocation of device 202 may be derived. Satellite-based positioning system 302 may be implemented by any suitable positioning system that includes a network of satellites in orbit (e.g., geosynchronous orbit) around the earth and configured to send signals that, when analyzed by devices on the earth's surface such as device 202, may be used to derive a geolocation of the device. For example, each satellite may send out a signal having a signal that differs slightly from signals sent by other satellites in the network of satellites depending on where the signal is received on the earth's surface (i.e., depending on a geolocation at which the signal is received). By comparing signals from different satellites in the network of satellites, a device may thus determine its own geolocation. Any suitable satellite system configured to provide such signals may implement satellite-based positioning system 302. For example, satellite-based positioning system 302 may be implemented by the GPS operated by the United States government or by similar systems owned and operated by other countries and entities around the world (e.g., Russia's Global Navigation Satellite System ("GLONASS"), China's BeiDou Navigation Satellite System, the European Union's Galileo system, etc.).

Because signals transmitted by satellite-based positioning system 302 must travel through the atmosphere, where they are prone to interference (e.g., magnetic interference, etc.), it may not be possible to determine an extremely precise geolocation (e.g., with a margin of error of mere centimeters) based on such signals alone. For example, the margin of error of certain satellite-based positioning systems currently available may be several meters or more. While such a margin of error may be acceptable for certain purposes for which satellite-based positioning systems are used, such a margin of error may be too high for various dynamic virtual boundary system implementations described herein. For example, if a user defines a user-specified geographic boundary to snugly fit her own yard so as to keep a pet out of the street and out of neighbors' yards, even a few meters of error may be too large an error for the system to viably provide safety and convenience for the dog, the neighbors, passersby, and so forth. Rather, it may be desirable to track the dog with an accuracy having a margin of error much less than several meters (e.g., less than one meter, less than ten centimeters, etc.) to ensure the safety and convenience of everyone and everything involved.

Consequently, instead of relying on signals from satellite-based positioning system 302 alone, system 100 may further employ a correction signal 312 generated by terrestrial positioning enhancement system 304. For example, correction signal 312 may be an RTK signal generated at an RTK base station that implements terrestrial positioning enhancement system 304. Correction signal 312 may correspond to positioning signal 310 by, for example, providing information that may be used to correct positioning signal 310. For example, correction signal 312 may mitigate interference or distortion introduced to positioning signal 310 in the atmosphere as positioning signal 310 travels from the satellite to be received by device 202.

Terrestrial positioning enhancement system 304 may be a physical base station located at a known, surveyed location on the ground, or may be a virtual (i.e., interpolated) base station at a specific location at which a physical base station is not actually located, but which is interpolated based on physical base stations. For example, terrestrial positioning enhancement system 304 may include a network of low-latency, high-speed, physical and/or virtual base stations configured to provide positioning enhancement coverage for large geographical areas (e.g., analogous to the communication coverage provided by a cellular network or the like). Because ground truth is known for the location of each physical or virtual base station, and because the base station also receives positioning signal 310 with whatever interference or distortion may have been introduced onto it, terrestrial positioning enhancement system 304 may generate correction signal 312 to allow a device receiving both signals 310 and 312 (e.g., device 202) to determine a very accurate geolocation of the device. For example, as mentioned above, device 202 may determine a refined geolocation having a margin of error of only a few centimeters or less.

While RTK technology has been mentioned as a preferred technology upon which terrestrial positioning enhancement system 304 may be based, other positioning enhancement technologies may be employed in certain implementations to similar effect. For example, instead of or in addition to RTK technology, terrestrial positioning enhancement system 304 may employ technologies such as Differential GPS ("DGPS"), various implementations of satellite-based augmentation system ("SBAS") such as European Geostationary Navigation Overlay Service ("EGNOS"), GPS-aided GEO augmented navigation ("GAGAN"), Positioning over LTE ("PoLTE"), or other suitable positioning enhancement technologies as may serve a particular implementation.

Network 306 may facilitate data delivery between client-side systems such as device 202 (e.g., as well as other real-time tracking devices in certain examples) and server-side systems such as controller system 308 in the server-client data delivery architecture illustrated by configuration 300. As such, network 306 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks, and data may be distributed using any suitable communication technologies included within network 306. As such, data may flow between device 202 and controller system 308 using any communication technologies, devices, media, and protocols as may serve a particular implementation.

Controller system 308 may be configured to communicate with device 200 over network 306 to facilitate the operations of system 100 (i.e., whether by implementing system 100 or enabling an implementation of system 100 on device 202) in various ways. For example, as will be described in more detail below, controller system 308 may provide interfacing with a user of system 100 who may wish to constrain subject 204 carrying device 202, and may offload certain processing tasks from device 202 in order to streamline operations and allow device 202 to be relatively small and lightweight.

Controller system 308 may be implemented in different ways or by different types of systems or devices in different contexts. For instance, in one implementation, controller system 308 may be implemented by an access device used by a user (e.g., a general-purpose computing device running a special-purpose software application, etc.), and network 306 may be implemented by a local area network such as a home Wi-Fi network. In such an example, the user-specified geographic boundary set up by the user may be limited to a geography covered by the local area network, thus making such an implementation more limited than implementations employing a network 306 with broader reach.

In other implementations, controller system 308 may be implemented by one or more servers or other computing systems operated by a service provider such as a cellular network service provider or the like, or by a combination of such servers and an access device such as described above. In these examples, network 306 may include a larger wireless network than the local area network described above. For instance, network 306 may include a cellular network (e.g., a 3G, 4G, or 5G data network) with national or global coverage. In these types of implementations, the user-specified geographic boundary set up by the user may not be limited to any small geography (e.g., such as that covered by a home Wi-Fi network), but, rather, may be imposed at any geographic location covered by both the cellular network and the coverage of systems 302 and 304.

Figure 4:
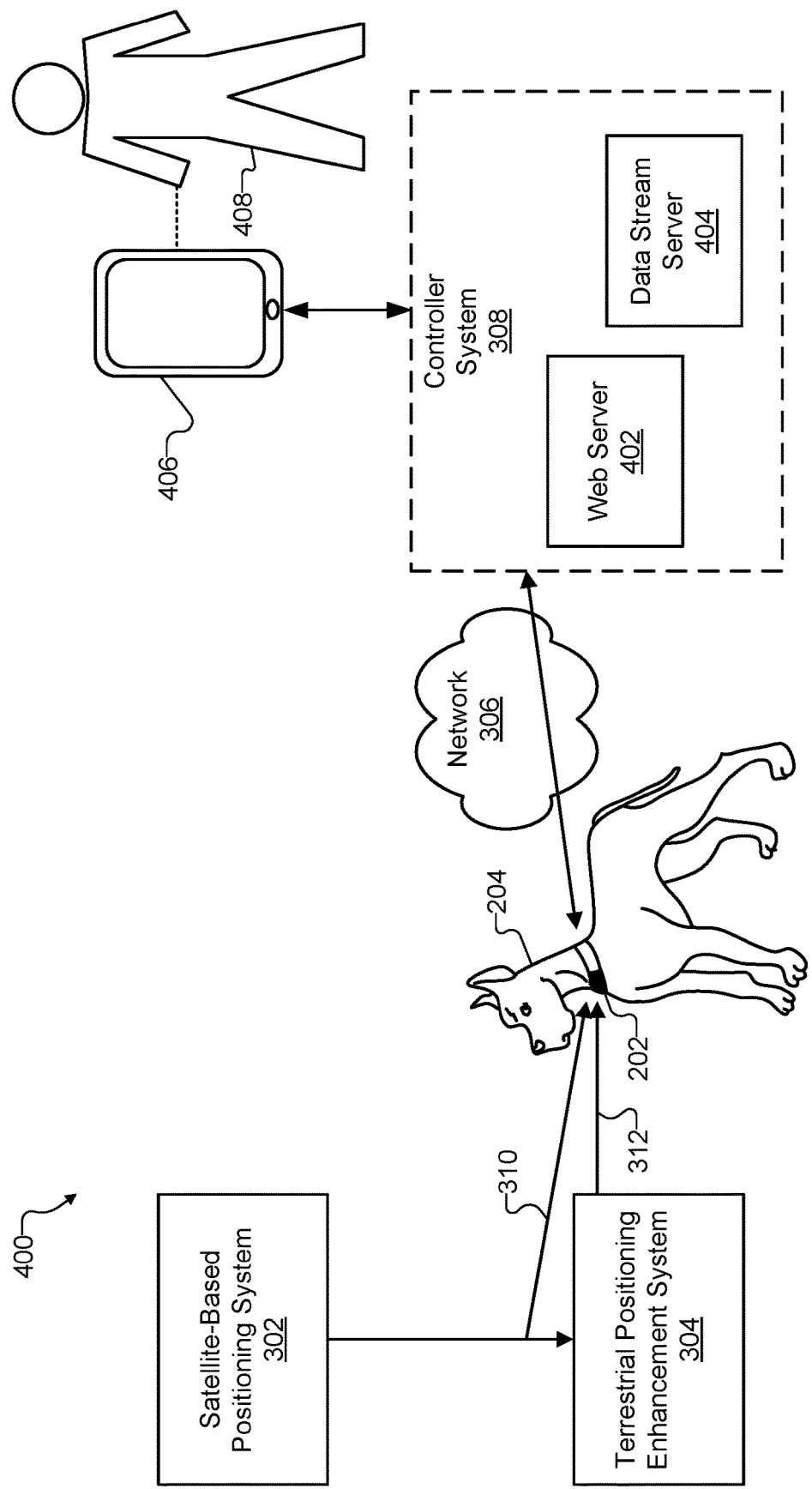

To illustrate such an implementation, FIG. 4 shows an exemplary configuration 400 similar to configuration 300 in which system 100 may operate to constrain subject 204 within area 206. However, while configuration 300 showed only an abstraction of a general controller system 308, configuration 400 shows a more detailed implementation of controller system 308 configured to provide a service linking a user and a pet (i.e., subject 204). Specifically, as illustrated in configuration 400, device 202 is shown to be implemented on a collar being worn by a dog playing the role of subject 204. Systems 302 and 304 respectively generate and provide positioning signal 310 and correction signal 312, as described above in relation to configuration 300, and device 202 communicates over network 306 with controller system 308 in a similar manner as has been described. In FIG. 4, however, controller system 308 is broken out to illustrate additional detail of a particular implementation in which a dynamic virtual boundary service is provided by a service provider (e.g., a cellular carrier or the like).

As shown, controller system 308 includes a web server 402, as well as a data stream server 404. Moreover, controller system 308 is shown to be in communication with an access device 406 being used by a user 408 (e.g., a person responsible for subject 204). It will be understood that the implementation details illustrated in configuration 400 are exemplary only and that, in other implementations, web server 402 and data stream server 404 may be implemented by a single server, or functionally broken out over additional servers not explicitly described for this example.

Web server 402 may perform various operations associated with collecting, maintaining, storing, and providing static information employed by (e.g., used by or accessed by) system 100. As such, web server 402 may be implemented by a 4G LTE server, a 5G mobile edge computing server running a loosely coupled microservice, or by any other suitable server as may serve a particular implementation. Web server 402 may register device 202 when device 202 first communicates with controller system 308, and may receive and maintain dynamic virtual boundary data defining a user-specified geographic boundary when such data is sent by access device 406 (e.g., after being specified by user 408). Web server 402 may further communicate with device 202 to facilitate the determination of the refined geolocation in any of the ways described herein, to provide alerts to device 202 (e.g., to direct device 202 to provide a shock or other indication to subject 204 when it is determined that subject 204 is within the predetermined distance of the user-specified geographic boundary), and so forth.

Data stream server 404 may perform various operations associated with using dynamic information to determine when device 202 is within the predetermined distance of the user-specified geographic boundary. For example, data stream server 404 may receive a continuous, real-time data stream from device 202 representative of the current geolocation (or, in certain examples, representative of signals 310 and 312 from which data stream server 404 may derive the current geolocation), and may maintain a history of where subject 204 has been located over a certain period of time. Data stream server 404 may further receive dynamic virtual boundary data from web server 402 and compare the dynamic virtual boundary data with the real-time data stream representative of the current geolocation to determine when subject 204 has come within the predetermined distance of the user-specified geographic boundary.

Access device 406 may be implemented by any computing device used by a user to access device 202 and/or to control a service provided by controller system 308 as may serve a particular implementation. For example, access device 406 may be implemented by a mobile device (e.g., a smartphone, a tablet device, a digital reader device, etc.), a personal computer (e.g., a laptop computer, a desktop computer, etc.), a special purpose device specifically designed for the purpose of implementing and/or controlling system 100, or any other suitable device. In order to perform the operations described herein, access device 406 may execute special-purpose software, such as a dynamic virtual boundary service application loaded onto access device 406.

Whether implemented within device 202, controller system 308, access device 406, or distributed across a combination thereof, system 100 may be configured to provide a user interface to access device 406 for presentation by access device 406 to user 408. For example, system 100 may provide the user interface by executing an application stored on access device 406, directing access device 406 to execute such an application, or facilitating the execution of such an application by access device 406 in any suitable manner (e.g., providing data used by the application in the presentation of the user interface, etc.). By way of this user interface, system 100 may receive user input from user 408. For example, the user input received by system 100 may define a user-specified geographic boundary. Accordingly, system 100 may dynamically generate dynamic virtual boundary data based on the user input. For example, system 100 may generate the dynamic virtual boundary data in real time as the user input is being received from user 408.

Figure 5:
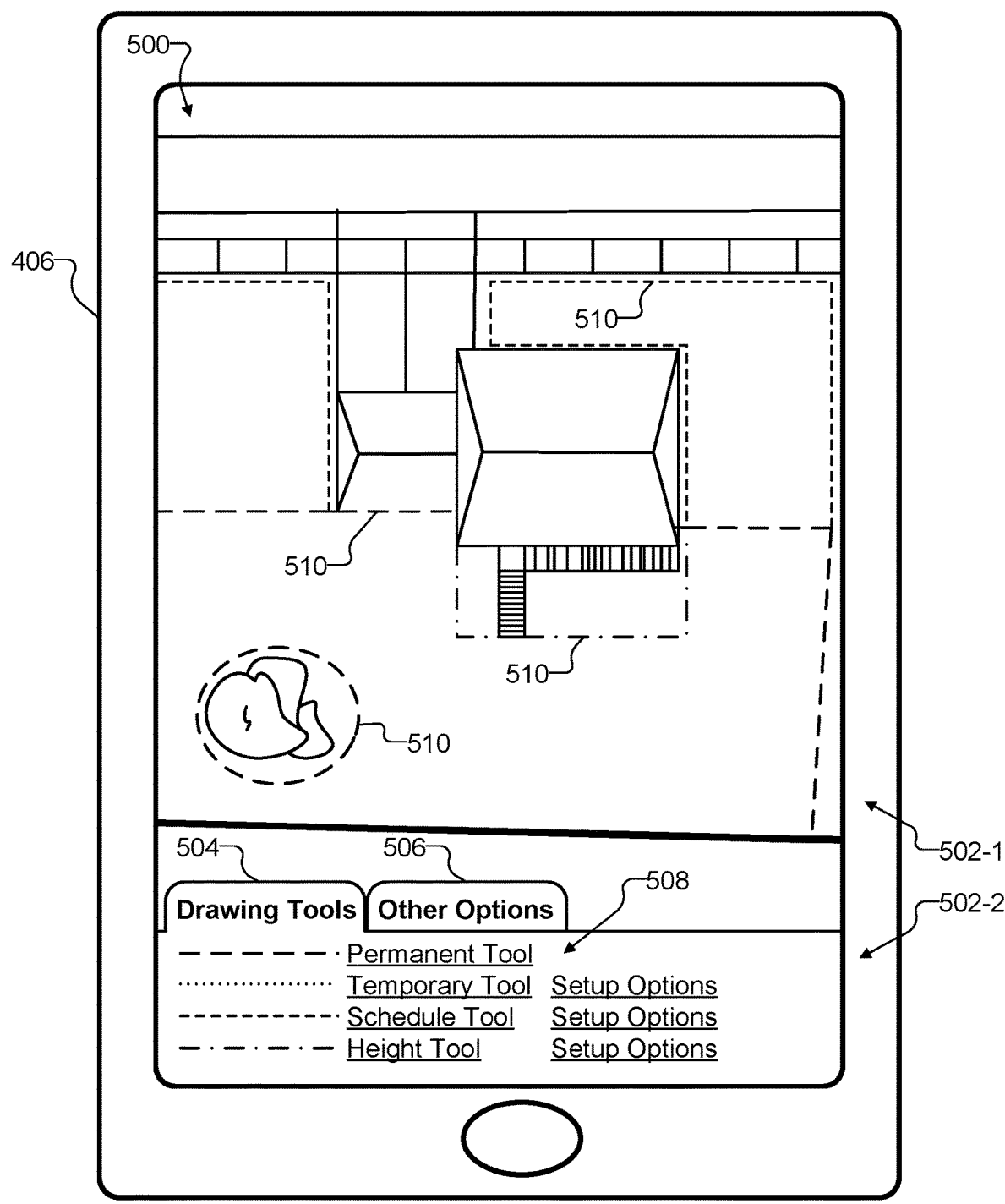
FIG. 5 illustrates an exemplary access device presenting a user interface that facilitates receiving user input defining a user-specified geographic boundary according to principles described herein.

FIG. 5 illustrates access device 406 as it is presenting an exemplary user interface 500 that facilitates receiving user input defining a user-specified geographic boundary. Specifically, as shown, user interface may include a plurality of panes 502 (e.g., panes 502-1 and 502-2). In pane 502-1, user interface 500 displays a map upon which user 408 may define the user-specified geographic boundary. For example, using pane 502-1, user interface 500 may allow user 408 to search the map for a particular location, jump to a current location, zoom and scroll the map, and perform other such operations using touch gestures or other such user input as may serve a particular implementation. In pane 502-2, user interface 500 may present a control panel having various tools and options to facilitate user 408 in defining the user-specified geographic boundary. The control panel may be laid out in any suitable way, such as with different tabs to help organize different types of tools and options. To illustrate, pane 502-2 shows a "Drawing Tools" tab 504 and an "Other Options" tab 506.

Various tools 508 (e.g., a permanent tool, a temporary tool, a schedule tool, a height tool, etc.) are included on tab 504, allowing user 408 to select these tools and use them to define (e.g., draw) different types of user-specified geographic boundaries 510 on the map presented in pane 502-1. Set up options accessed by way of links on tab 504 or other options accessible by way of tab 506 may further facilitate user 408 in defining user-specified geographic boundaries 510. Once user-specified geographic boundary 510 is defined in this way, user interface 500 may allow user-specified geographic boundary 510 to be saved. Access device 406 may thus generate and store dynamic virtual boundary data representative of user-specified geographic boundary 510 as it has been defined by user 408. In some examples, as described above, access device 406 may also transmit the dynamic virtual boundary data to controller system 308 (e.g., to web server 402), where the dynamic virtual boundary data may be used to implement system 100 in any of the ways described herein.

Using tools 508 (and other similar tools not explicitly described herein), user 408 may define, update, modify, and otherwise manage a user-specified geographic boundary 510 in real time and with a great amount of flexibility as may serve a particular implementation. User-specified geographic boundary 510 may be characterized by various features that may or may not be possible with other types of boundary systems, as will now be described in more detail in relation to FIG. 6.

Figure 6:
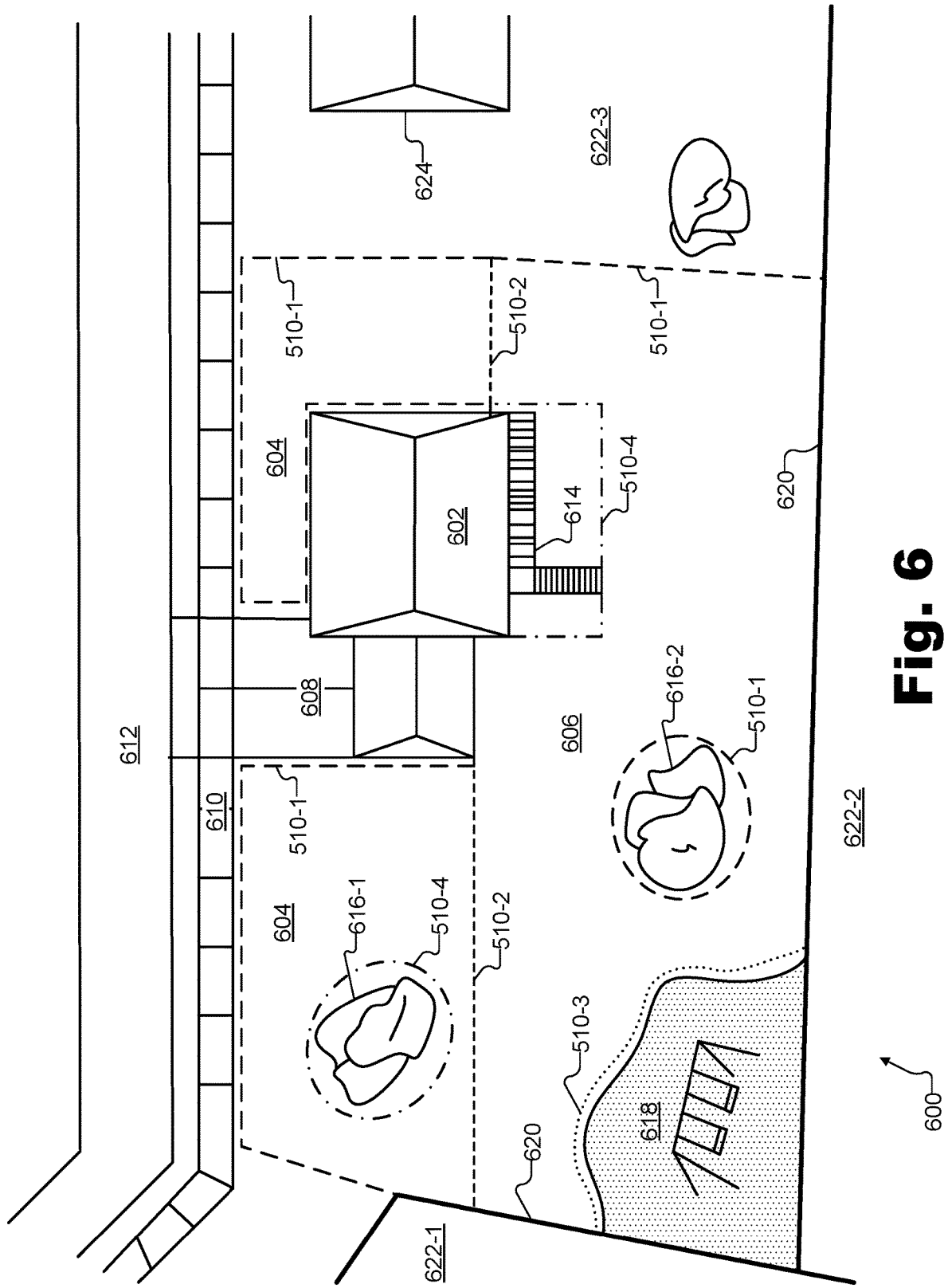
FIG. 6 illustrates an exemplary geographical area within which a user-specified geographic boundary is defined according to principles described herein.

FIG. 6 illustrates an exemplary geographical area 600 within which user-specified geographic boundary 510 (consisting of various different types of user-specified geographic boundary segments 510-1 through 510-4) is defined. For example, geographical area 600 may correspond to an area presented to user 408 on a map within user interface 500. Depicted from an overhead view as shown, geographical area 600 includes a house 602 (e.g., within which user 408 may live) having a front yard 604 and a back yard 606. Front yard 604 is split into two sections by a driveway 608, which crosses a sidewalk 610 to connect to a street 612 in front of house 602. As further shown, house 602 includes a back deck 614, and two trees 616 (i.e., a tree 616-1 in front yard 604, and a tree 616-2 in back yard 606). In the corner of back yard 606, a play area 618 (e.g., including sand and a swing set or other such play structure) is shown. Physical fences 620 are shown to separate the property associated with house 602 from a property 622-1 (e.g., associated with a house located to the left of house 602 (not explicitly shown)) and from a property 622-2 (e.g., associated with a house located behind house 602 (also not explicitly shown)). However, it is noted that no physical fence is present between the property associated with house 602 and a property 622-3 associated with a house 624 located to the right of house 602.

Various segments of user-specified geographic boundary 510 are illustrated on and around the property associated with house 602. For example, a first type of user-specified geographic boundary segment is illustrated by a first style of dashed line labeled 510-1. These segments will thus be referred to as segments 510-1. As was illustrated in FIG. 5, a "Permanent Tool" 508 may be used to define segments 510-1 to be relatively permanent. As such, for example, segments 510-1 are shown to essentially outline the portions of front yard 604 and back yard 606 that are not already covered by a physical fence, as well as to block off driveway 608 (e.g., to keep subject 204 from danger as cars drive in and out of driveway 608 from street 612). While fence 620 may operate to physically prevent subject 204 from straying onto property 622-1 and 622-2, segments 510-1 may be used to further ensure that subject 204 does not stray onto sidewalk 610, into street 612, onto driveway 608, onto property 622-3, or near tree 616-2 (e.g., which may drop fruit or seeds that, if eaten by subject 204, could make the animal sick), where no physical barriers otherwise exist.

While segments 510-1 are referred to herein as "permanent," it will be understood that they are only permanent in the sense that these segments may remain in place at all times and circumstances until directed otherwise by additional user input (unlike certain other types of user-specified geographic boundary segments, as will be described below). However, it will be understood that user 408 may remove, redraw, or otherwise edit segments 510-1 at any time.

A second type of user-specified geographic boundary segment is illustrated by a second style of dashed line labeled 510-2. These segments will thus be referred to as segments 510-2. As was illustrated in FIG. 5, a "Schedule Tool" 508 may be used to define segments 510-2 to only be implemented at one or more certain times (e.g., in accordance with a recurring schedule). For example, user 408 may wish to grant subject 204 free reign of both front yard 604 and back yard 606 (in accordance with segments 510-1) under normal circumstances, but may wish to keep subject 204 out of front yard 604 during hours right before the school day begins and right after the school day ends, as children may be walking along sidewalk 610 at those times and may tease subject 604, be barked at by subject 604, or the like. Accordingly, user interface 500 may allow user 408 to not only draw segments 510-2 so as to constrain subject 204 within back yard 606, but may also set up a schedule for when segments 510-2 are to be imposed. For example, by selecting the "Setup Options" link next to the "Schedule Tool" 508, user 408 may be able to set up segments 510-2 to be operational on weekdays from 7:30-8:30 AM, and from 3:00-4:00 PM in one example.

While user-specified geographic boundary 510 may be able to change instantaneously (e.g., when user 408 saves a newly drawn or modified boundary using user interface 500), it may be desirable in certain circumstances for boundaries to change gradually so as to help gently coax subject 204 to stay in a shifting area rather than, for example, suddenly punishing subject 204 for being outside an area that changed unexpectedly. For instance, in the example given above, it may be desirable for subject 204 to be constrained within back yard 606 starting at 3:00 PM. Because subject might legitimately be located within front yard 604 at 2:59 PM if user-specified geographic boundary 510 were to change instantaneously (thereby confusing and unfairly punishing subject 204 when the boundary changes at 3:00), it may be desirable to begin gradually mutating segments 510-1 within front yard 604 a few minutes before 3:00 PM so that subject 204 may move out of front yard 604 and into back yard 606 by 3:00 PM when segments 510-2 become effective.

In some examples, system 100 may be configured to continuously monitor whether the refined geolocation of device 202 is within the predetermined distance of user-specified geographic boundary 510 as user-specified geographic boundary 510 changes in real time. In particular, user-specified geographic boundary 510 may change under manual direction from user 408, or may change automatically in accordance with settings prespecified by user 408. For instance, in certain examples, user-specified geographic boundary 510 may be configured to change in real time in accordance with automatic and gradual changes (e.g., changes that mutate an area from one shape to another) prespecified by user 408 to apply to user-specified geographic boundary 510 at a prescheduled time set by user 408 (e.g., at 2:45 PM so that the mutation will be complete by 3:00 PM in this example).

Figure 7:
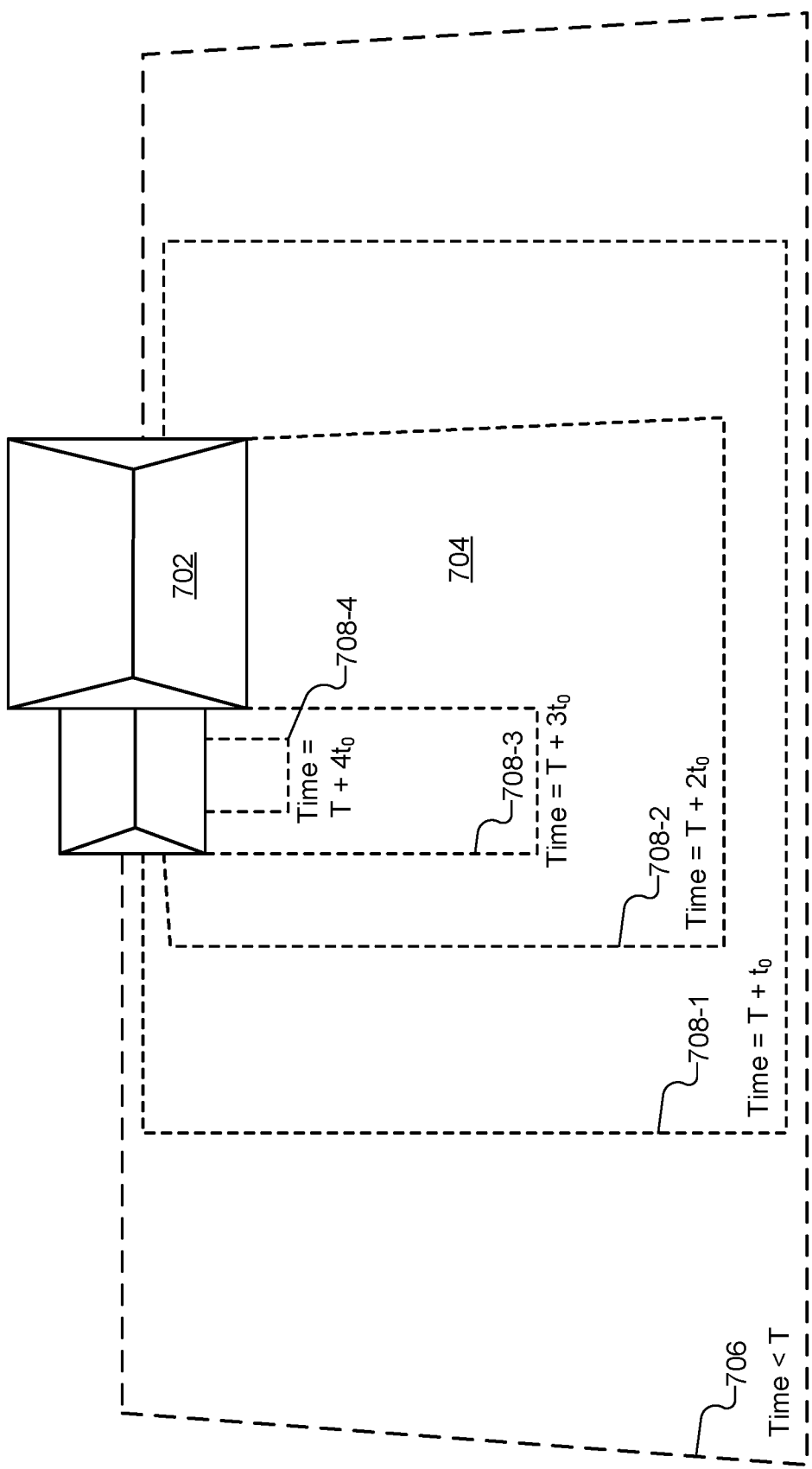
FIG. 7 illustrates an exemplary user-specified geographic boundary configured to automatically and gradually change at prescheduled times and in accordance with prespecified settings set by the user according to principles described herein.

To illustrate another example of how automatic and gradual mutations of a user-specified geographic boundary may be used to move, herd, and/or train animals, FIG. 7 shows an exemplary user-specified geographic boundary configured to automatically and gradually change at prescheduled times and in accordance with prespecified settings set by a user. In the example of FIG. 7, a house 702 having a yard 704 is depicted to have a permanent user-specified geographic boundary 706 around yard 704. At a time "T" (e.g., 8:00 PM), the user may desire that pets within yard 704 begin making their way into a garage of house 702, where they will stay for the night. Accordingly, at Time=T (e.g., at 8:00 PM), an alert (e.g., a vibration or the like) may be delivered to each subject in yard 704 to indicate that it is time to come inside. Then, at intervals of length $t_0$ (e.g., which may be 5 minutes in one example), increasingly small scheduled user-specified geographic boundaries 708 (e.g., user-specified geographic boundaries 708-1 through 708-4) may become operational to gradually direct the subjects into a shrinking corridor and, ultimately, into the garage of house 702 where they belong. Specifically, at Time=T+$t_0$ (e.g., 8:05 PM) user-specified geographic boundary 706 may shrink to become user-specified geographic boundary 708-1, at Time=T+$2t_0$ (e.g., 8:10 PM) user-specified geographic boundary 708-1 may shrink to become user-specified geographic boundary 708-2, at Time=T+$3t_0$ (e.g., 8:15 PM) user-specified geographic boundary 708-2 may shrink to become user-specified geographic boundary 708-3, and at Time=T+$4t_0$ (e.g., 8:20 PM) user-specified geographic boundary 708-3 may shrink to become user-specified geographic boundary 708-4, at which point the subjects may all be within the garage without the user having had to manually herd the subjects in.

While user-specified geographic boundaries 708 are illustrated as discrete boundaries that become operational at discrete times in the example of FIG. 7, it will be understood that these boundaries may, in certain examples, represent mere snapshots of a shrinking user-specified geographic boundary that mutates gradually from Time=T until Time=T+$4t_0$ (e.g., between 8:00 and 8:20 PM). Over time, consistent herding of one or more subjects in these ways may help train the subjects to be more readily conformant to a desired schedule (e.g., to come into the garage immediately when a first alert is provided, when the sun sets, etc.). As such, system 100 may be configured to implement a similarly effective herding effect using a shorter time interval $t_0$ after subjects begin to become accustomed to a consistent schedule, and user interface 500 may allow the user to manually change interval $t_0$. In some examples, system 100 may be configured to automatically and gradually change (e.g., reduce) interval $t_0$ over time as subjects become accustomed to the schedule (e.g., as determined by tracking the subjects around Time=T each day).

Returning to FIG. 6, a third type of user-specified geographic boundary segment is illustrated by a dotted line in a third style that is labeled 510-3. This segment will thus be referred to as segment 510-3. As was illustrated in FIG. 5, a "Temporary Tool" 508 may be used to define segment 510-3 to only be implemented temporarily (i.e., so as to disengage automatically after a set period of time). For example, user 408 may normally allow subject 204 to go into play area 618, but may wish to keep subject 204 out of play area 618 when it is in use under certain circumstances (e.g., when young grandchildren come to visit, when a child with a pet allergy is visiting, when the family is having a picnic within play area 618 and do not wish to be disturbed by subject 204, etc.). Accordingly, user interface 500 may allow user 408 to not only draw segment 510-3 so as to keep subject 204 out of play area 618, but may also set up a time for segment 510-3 to automatically expire without user 408 having to remember to remove segment 510 manually. For example, by selecting the "Setup Options" link next to the "Temporary Tool" 508, user 408 may be able to set up segment 510-3 to expire after a certain period of time (e.g., three hours) or at a certain time of day (e.g., at 10:00 PM that evening).

A fourth type of user-specified geographic boundary segment is illustrated by dash-dotted lines in a fourth style labeled 510-4. These segments will thus be referred to as segments 510-4. As was illustrated in FIG. 5, a "Height Tool" 508 may be used to define segments 510-4 to impose height limitations (i.e., to impose different limitations at different distances up from the ground). As described above, user-specified geographic boundaries such as user-specified geographic boundary 510 may, in some examples, be specified as 3D user-specified geographic boundaries defining not only a geographical area but also defining a height that bounds at least a portion of the area. For example, user 408 may wish to allow subject 204 to enjoy shade from tree 616-1 and/or from under back deck 614 (which may be a deck on a second level of house 602), but may wish to disallow subject 204 from climbing up into tree 616-1 or from ascending the stairs to go up onto back deck 614. Accordingly, user interface 500 may allow user 408 to specify that segments 510-4 are special segments that apply only to certain heights off the ground. For example, by selecting the "Setup Options" link next to the "Height Tool" 508, user 408 may be able to set up segments 510-4 to disallow subject 204 from certain heights in certain areas (e.g., to prevent subject 204 them from climbing high into the tree, more than halfway up the stairs to back deck 614, etc.).

In operation, once user-specified geographic boundary 510 has been defined and implemented, system 100 may be configured to provide alerts configured to assist in constraining subject 204 within the area defined by user-specified geographic boundary 510 in any of the ways described herein. For example, system 100 may provide an alert to a subject (e.g., subject 204) carrying a real-time tracking device by indicating to the subject that the subject has reached the user-specified geographic boundary. As another example, system 100 may provide an alert to a user of an access device (e.g., user 408 of access device 406) who has authority over the subject and may desire to know a status of the subject as pertaining to the user-specified geographic boundary the user has defined. To illustrate, FIG. 8 shows alerts that may be provided to subject 204 by way of device 202, while FIG. 9 shows alerts that may be provided to user 408 by way of access device 406.

Figure 8:
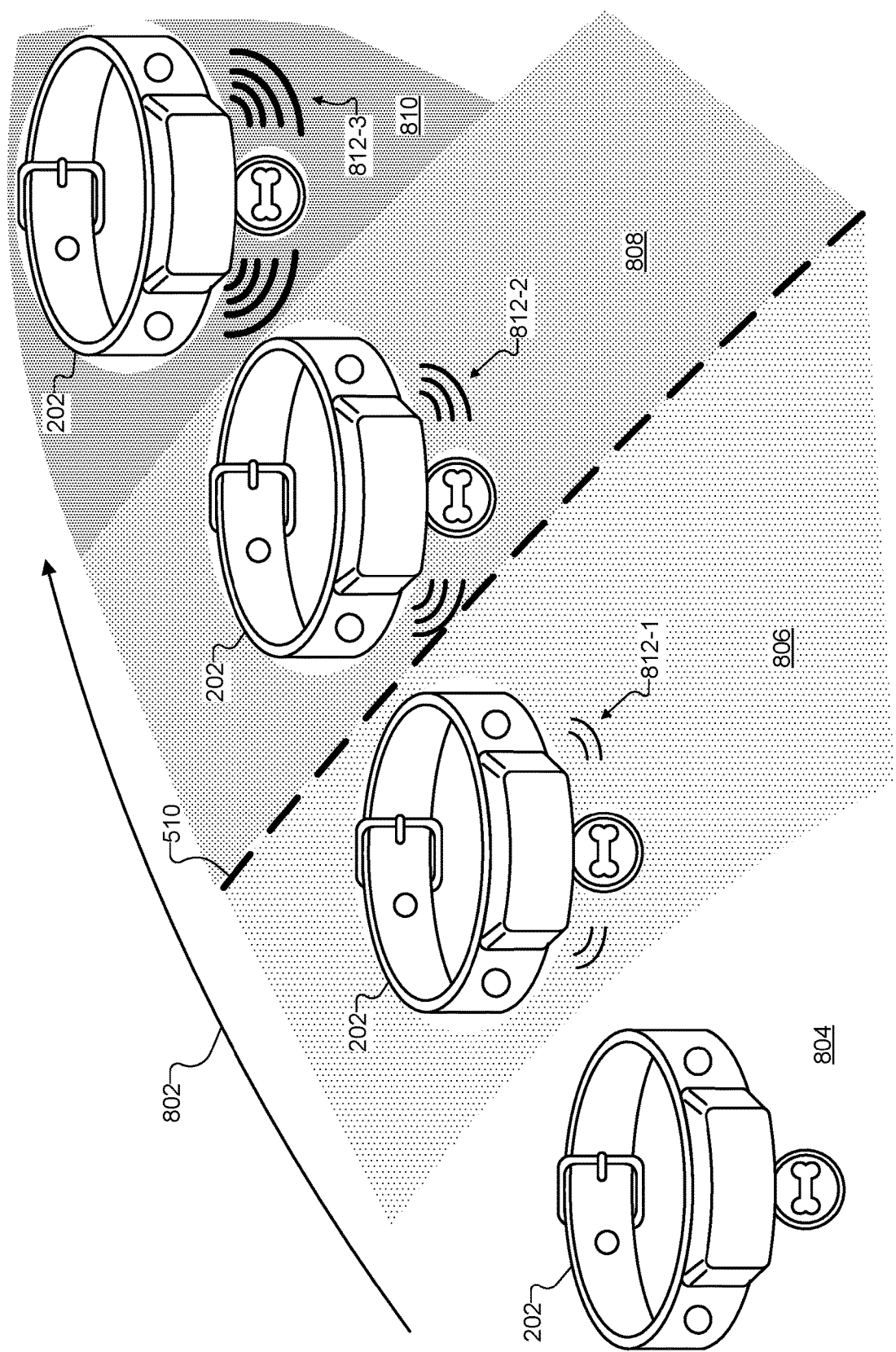
FIG. 8 illustrates an exemplary real-time tracking device at several locations with respect to a user-specified geographic boundary as the real-time tracking device approaches and crosses the user-specified geographic boundary according to principles described herein.
Figure 9:
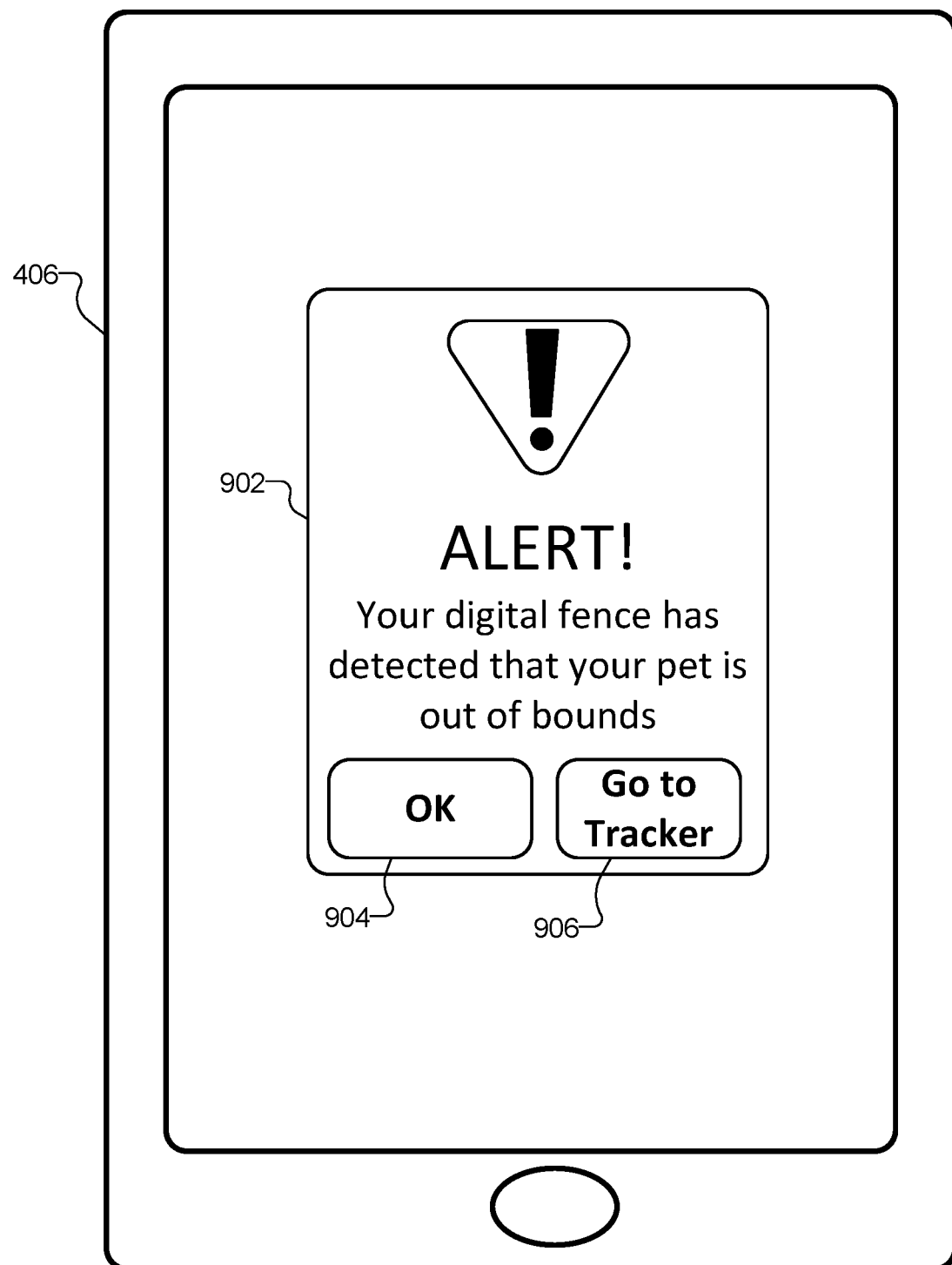
FIG. 9 illustrates an exemplary alert configured to assist in constraining a subject within an area defined by a user-specified geographic boundary according to principles described herein.

As shown, FIG. 8 depicts real-time tracking device 202 at several locations with respect to user-specified geographic boundary 510 as device 202 approaches and crosses user-specified geographic boundary 510. Subject 204 may carry device 202 from within an area defined by user-specified geographic boundary 510 to a location outside the area defined by user-specified geographic boundary 510 in accordance with a movement 802 labeled in FIG. 8 with an arrow. For example, movement 802 may occur over the course of a period of time (e.g., a few seconds) as subject 204 moves from area 804 (which is outside of a predetermined distance from user-specified geographic boundary 510), to an area 806 (which is within the buffer zone of the predetermined distance from user-specified geographic boundary 510), to an area 808 (which is also within the buffer zone of the predetermined distance from user-specified geographic boundary 510 but is outside of the area defined by user-specified geographic boundary 510), and to an area 810 (which outside the area defined by user-specified geographic boundary 510 as well as the buffer zone).

Different types of alerts 812 (e.g., alerts 812-1 through 812-3) may be provided to subject 204 to assist in constraining subject 204 within the area defined by user-specified geographic boundary 510. Specifically, alerts 812 may increase in severity based on where subject 204 is located, which direction subject 204 is moving, how fast subject 204 is moving, and so forth. Ultimately, the goal may be to gently but firmly encourage subject 204 to stay within area 804 or to return to area 804 when subject 204 has strayed from area 804. To this end, no alert may be given as long as subject 204 remains well within the area defined by user-specified geographic boundary 510 (i.e., within area 804), but, as shown, alert 812-1 may be imposed when device 202 is carried into area 806 (i.e., within the predetermined distance of user-specified geographic boundary 500). Alert 812-1 may be implemented as a mild indication to subject 204 that subject 204 is approaching user-specified geographic boundary 510 and should proceed with caution or turn around. Alert 812-1 may be more informational than punitive, and may be implemented, for example, as a vibration, a sound, a mild shock, or the like.

As subject 204 continues along movement 802 into area 808, alert 812-2 may be provided by way of device 202. Alert 812-2 may be more severe or punitive than alert 812-1, because subject 204 has now crossed over user-specified geographic boundary 510 and has left the area within which system 100 is meant to constrain subject 204. For instance, alert 812-2 may include a shock (e.g., a stronger shock than may have been implemented by alert 812-1), a chemical deterrent (e.g., a puff of citronella to the face of subject 204), an unpleasant sound, or any other alert as may serve to encourage subject 204 to turn back and move away from user-specified geographic boundary 510.

Finally, if subject 204 continues along movement 802 into area 810, system 100 may direct device 202 to provide alert 812-3. Alert 812-3 may be implemented similarly to alert 812-2, but may be even more severe or punitive because subject 204 has now strayed well outside user-specified geographic boundary 510 and needs to return immediately to the area within which system 100 is meant to constrain subject 204. While alerts 812-1 and 812-2 may be single-instance alerts (e.g., a short ding, a short shock) or may repeat intermittently (e.g., once per second) while device 202 remains in areas 806 or 808, alert 812-3 may be continuous, unrelenting, and/or increasing in amplitude over time so as to make it unpleasant (e.g., increasingly unpleasant) for subject 204 to remain outside of user-specified geographic boundary 510. In this way, subject 204 may be highly incentivized to immediately return to area 804 in order to reduce and eliminate alerts 812.

In some examples, directional alerts (e.g., vibration or shocks coming from different parts of device 202) may be used to indicate a direction in which subject 204 should go to reduce and eliminate alerts 812. For example, shock pads may be included around the perimeter of device 202 and pads further outside the area defined by user-specified geographic boundary 510 may be configured to provide a noticeably greater shock than pads closer to area 804. In this way, it may be intuitive even to an animal which way the animal needs to move to reduce and eliminate the alerts.

To illustrate an alert provided to a user, FIG. 9 shows an exemplary alert provided to user 408 by way of access device 406. As shown, access device 406 displays an alert 902 (e.g., a pop-up notification or any other suitable type of notification or alert) indicating to user 406 that "Your digital fence has detected that your pet is out of bounds." Based on alert 902, user 406 may take note and appropriate action. For example, after taking note of alert 902, user 406 may normally assume that subject 204 will be brought back into the area defined by user-specified geographic boundary 510, and may select an "OK" option 904 to dismiss alert 902. However, if for some reason subject 204 continues to remain near the boundary or outside of the defined area, additional alerts similar to alert 902 may eventually cause user 406 to take additional action. For example, user 406 may physically go check on subject 204 (if user 406 is nearby subject 204), or may use system 100 to track subject 204, such as by selecting a "Go to Tracker" option 906.

In some examples, system 100 may be configured to display a real-time representation of the location of subject 204 (e.g., on a map within user interface 500) as system 100 tracks subject 204 in real time. Additionally, in certain examples, system 100 may store a history of where subject 204 has gone so that user 406 may look for patterns that may allow user 406 to improve user-specified geographic boundary 510. For example, the history may indicate that every day between 2:00 and 3:00 PM when the mail comes, subject 204 goes to the front yard and crosses user-specified geographic boundary 510 as subject 204 barks at a postal worker. As a result, user 406 may use this information to set up a scheduled user-specified geographic boundary segment to bring subject 204 into the back yard or to otherwise keep subject 204 away from the mailbox around that time.

Figure 10:
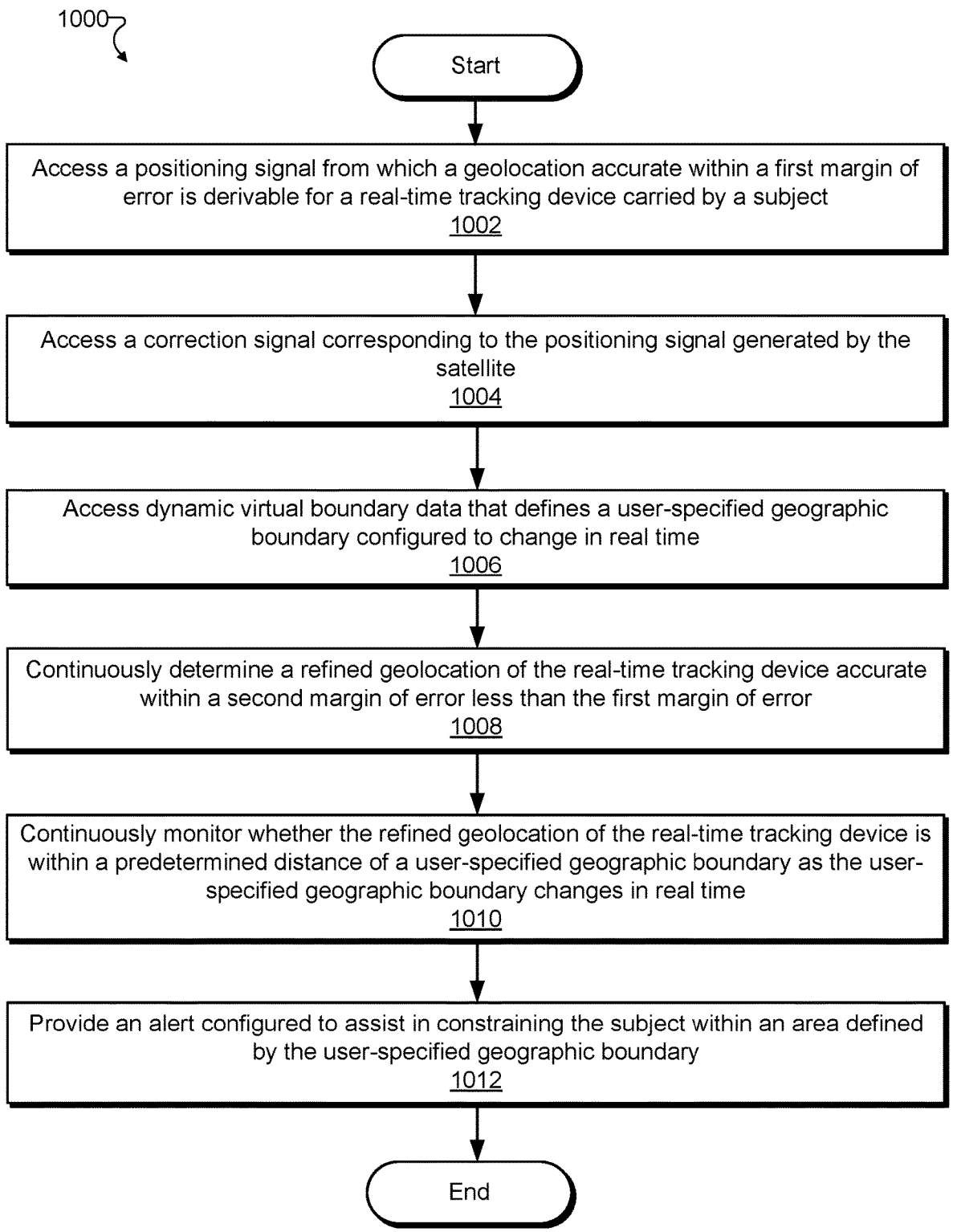
FIG. 10 illustrates an exemplary method for constraining a subject within an area defined by a user-specified geographic boundary according to principles described herein.

FIG. 10 illustrates an exemplary method 1000 for constraining a subject within an area defined by a user-specified geographic boundary. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a dynamic virtual boundary system may access a positioning signal from which a geolocation accurate within a first margin of error is derivable for a real-time tracking device carried by a subject. For example, the positioning signal may be generated by a satellite included within a satellite-based positioning system, and may be received by the real-time tracking device. Operation 1002 may be performed in any of the ways described herein.

In operation 1004, the dynamic virtual boundary system may access a correction signal corresponding to the positioning signal generated by the satellite and accessed in operation 1002. In some examples, the correction signal may be generated by a terrestrial positioning enhancement system and received by the real-time tracking device. Operation 1004 may be performed in any of the ways described herein.

In operation 1006, the dynamic virtual boundary system may access dynamic virtual boundary data that defines a user-specified geographic boundary configured to change in real time. Operation 1006 may be performed in any of the ways described herein.

In operation 1008, the dynamic virtual boundary system may continuously determine a refined geolocation of the real-time tracking device. For example, the dynamic virtual boundary system may continuously determine the refined geolocation based on the positioning signal accessed in operation 1002 and the correction signal accessed in operation 1004. The refined geolocation may be accurate within a second margin of error less than the first margin of error. Operation 1008 may be performed in any of the ways described herein.

In operation 1010, the dynamic virtual boundary system may continuously monitor whether the refined geolocation of the real-time tracking device is within a predetermined distance of the user-specified geographic boundary accessed in operation 1006. For instance, the dynamic virtual boundary system may continuously monitor whether the refined geolocation of the real-time tracking device is within the predetermined distance as the user-specified geographic boundary changes in real time. Operation 1010 may be performed in any of the ways described herein.

In operation 1012, the dynamic virtual boundary system may provide an alert configured to assist in constraining the subject within an area defined by the user-specified geographic boundary. For example, the dynamic virtual boundary system may provide the alert based on a determination during operation 1010 that the refined geolocation is within the predetermined distance of the user-specified geographic boundary. Operation 1012 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
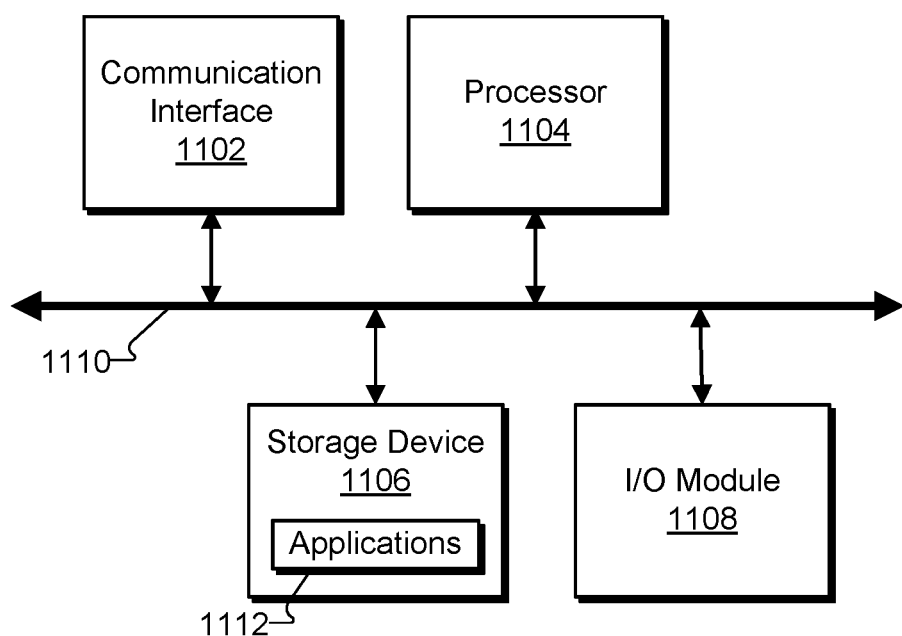
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 through 106 of system 100. Likewise, storage facility 108 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    accessing, by a virtual boundary system, a positioning signal generated by a positioning system, wherein a geolocation for a real-time tracking device is derivable from the positioning signal within a first margin of error;
    accessing, by the virtual boundary system, a correction signal generated by a positioning enhancement system and corresponding to the positioning signal generated by the positioning system;
    determining, by the virtual boundary system based on the positioning signal and the correction signal, a refined geolocation of the real-time tracking device relative to a user-specified geographic boundary, the refined geolocation accurate within a second margin of error less than the first margin of error; and
    providing, by the virtual boundary system based on the refined geolocation, an alert configured to assist in constraining a subject within the user-specified geographic boundary.

2. The method of claim 1, wherein:
    the user-specified geographic boundary is defined by a user of the virtual boundary system and is updated by the user in real time; and
    the method further comprises:
        accessing, by the virtual boundary system, dynamic virtual boundary data that defines the user-specified geographic boundary, and
        continuously monitoring, by the virtual boundary system as the user-specified geographic boundary is updated in real time, whether the refined geolocation of the real-time tracking device is within a predetermined distance of the user-specified geographic boundary.

3. The method of claim 2, further comprising:
    providing, by the virtual boundary system to an access device used by the user, a user interface for presentation by the access device to the user;
    receiving, by the virtual boundary system by way of the user interface, user input from the user; and
    dynamically generating, by the virtual boundary system based on the user input and in real time during the receiving of the user input, the dynamic virtual boundary data that defines the user-specified geographic boundary.

4. The method of claim 2, wherein the user-specified geographic boundary is configured to change in real time in accordance with automatic and gradual changes prespecified by the user to apply to the user-specified geographic boundary at a prescheduled time set by the user.

5. The method of claim 1, wherein:
    the user-specified geographic boundary defines a geographic area to which the subject is to be constrained; and
    the user-specified geographic boundary is specified as a three-dimensional ("3D") user-specified geographic boundary defining the geographic area and defining a height that bounds at least a portion of the geographic area.

6. The method of claim 1, wherein:
    the user-specified geographic boundary defines a geographic area to which the subject is to be constrained; and
    the providing of the alert is performed when the refined geolocation is determined to be outside the geographic area or inside the geographic area within a threshold distance of the user-specified geographic boundary.

7. The method of claim 6, wherein the alert is provided to the subject as the subject carries the real-time tracking device to thereby assist in constraining the subject within the geographic area by indicating to the subject that the subject is too close to the user-specified geographic boundary.

8. The method of claim 6, wherein the alert is provided to the user as the subject carries the real-time tracking device to thereby assist in constraining the subject within the geographic area by informing the user that the subject is near the user-specified geographic boundary so as to facilitate the user in taking action to constrain the subject.

9. The method of claim 1, wherein:
    the positioning system is a satellite-based positioning system that includes a satellite that generates the positioning signal to be received by the real-time tracking device; and
    the positioning signal generated by the satellite is a global positioning system ("GPS") signal.

10. The method of claim 1, wherein:
    the positioning enhancement system is a terrestrial positioning enhancement system that generates the correction signal to be received by the real-time tracking device; and
    the correction signal corresponding to the positioning signal is a real-time kinematic ("RTK") signal generated at an RTK base station associated with the terrestrial positioning enhancement system.

11. The method of claim 1, wherein the real-time tracking device is implemented by a pet collar configured to be worn by an animal.

12. A system comprising:
    a memory storing instructions; and
    a processor communicatively coupled to the memory and configured to execute the instructions to:
        access a positioning signal generated by a positioning system, wherein a geolocation for a real-time tracking device is derivable from the positioning signal within a first margin of error;

access a correction signal generated by a positioning enhancement system and corresponding to the positioning signal generated by the positioning system;

determine, based on the positioning signal and the correction signal, a refined geolocation of the real-time tracking device relative to a user-specified geographic boundary, the refined geolocation accurate within a second margin of error less than the first margin of error; and provide, based on the refined geolocation, an alert configured to assist in constraining a subject within the user-specified geographic boundary.

13. The system of claim 12, wherein:

the user-specified geographic boundary is defined by a user of the virtual boundary system and is updated by the user in real time; and the processor is further configured to execute the instructions to:

access dynamic virtual boundary data that defines the user-specified geographic boundary, and continuously monitor, as the user-specified geographic boundary is updated in real time, whether the refined geolocation of the real-time tracking device is within a predetermined distance of the user-specified geographic boundary.

14. The system of claim 13, wherein the processor is further configured to execute the instructions to:

provide, to an access device used by the user, a user interface for presentation by the access device to the user;

receive user input from the user by way of the user interface; and dynamically generate, based on the user input and in real time during the receiving of the user input, the dynamic virtual boundary data that defines the user-specified geographic boundary.

15. The system of claim 13, wherein the user-specified geographic boundary is configured to change in real time in accordance with automatic and gradual changes prespecified by the user to apply to the user-specified geographic boundary at a prescheduled time set by the user.

16. The system of claim 12, wherein:

the user-specified geographic boundary defines a geographic area to which the subject is to be constrained; and the providing of the alert is performed when the refined geolocation is determined to be outside the geographic area or inside the geographic area within a threshold distance of the user-specified geographic boundary.

17. The system of claim 16, wherein the alert is provided, as the subject carries the real-time tracking device, to at least one of:

the subject to thereby assist in constraining the subject within the geographic area by indicating to the subject that the subject is too close to the user-specified geographic boundary; or the user to thereby assist in constraining the subject within the geographic area by informing the user that the subject is near the user-specified geographic boundary so as to facilitate the user in taking action to constrain the subject.

18. The system of claim 12, wherein:

the positioning system is a satellite-based positioning system that includes a satellite that generates the positioning signal to be received by the real-time tracking device;

the positioning signal generated by the satellite is a global positioning system ("GPS") signal;

the positioning enhancement system is a terrestrial positioning enhancement system that generates the correction signal to be received by the real-time tracking device; and the correction signal corresponding to the positioning signal is a real-time kinematic ("RTK") signal generated at an RTK base station associated with the terrestrial positioning enhancement system.

19. The system of claim 12, wherein the real-time tracking device is implemented by a pet collar configured to be worn by an animal.

20. A non-transitory computer-readable medium storing instructions that, when executed, direct a processor of a computing device to:

access a positioning signal generated by a positioning system, wherein a geolocation for a real-time tracking device is derivable from the positioning signal within a first margin of error;

access a correction signal generated by a positioning enhancement system and corresponding to the positioning signal generated by the positioning system;

determine, based on the positioning signal and the correction signal, a refined geolocation of the real-time tracking device relative to a user-specified geographic boundary, the refined geolocation accurate within a second margin of error less than the first margin of error; and provide, based on the refined geolocation, an alert configured to assist in constraining a subject within the user-specified geographic boundary.

* * * * *